Sept. 17, 1957 P. AUGUST 2,806,680
TRANSPORTABLE CONCRETE OR MORTAR MIXER
Filed Aug. 23, 1955 2 Sheets-Sheet 1
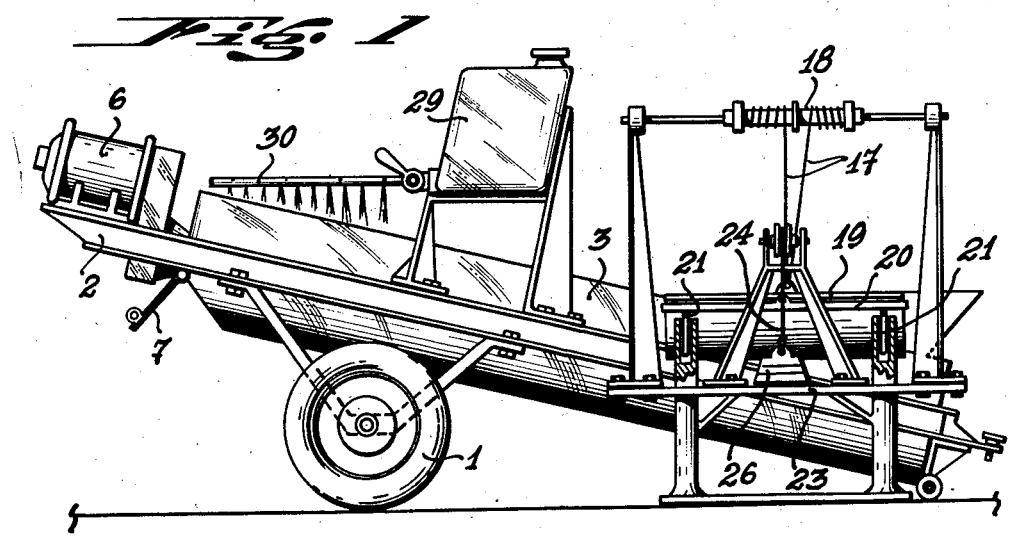
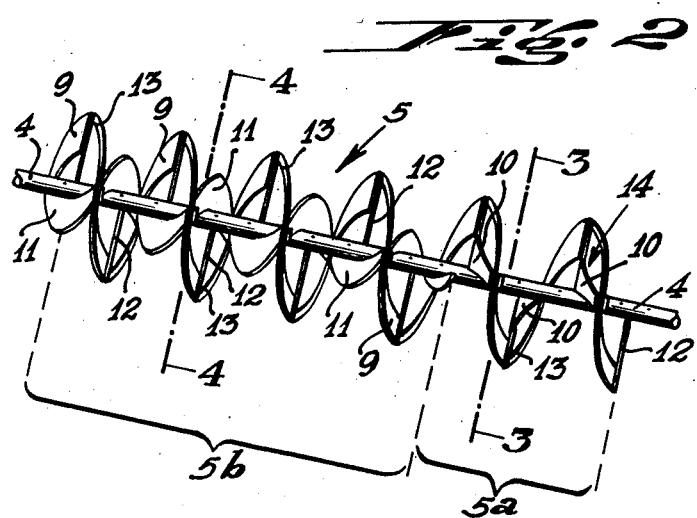
INVENTOR.
PABLO AUGUST
BY
Attorneys Sept. 17, 1957 P. AUGUST 2,806,680
TRANSPORTABLE CONCRETE OR MORTAR MIXER
Filed Aug. 23, 1955 2 Sheets-Sheet 2
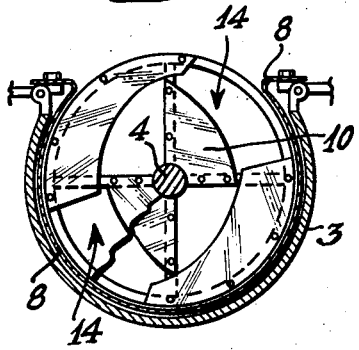
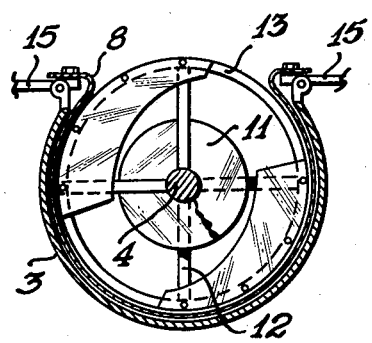
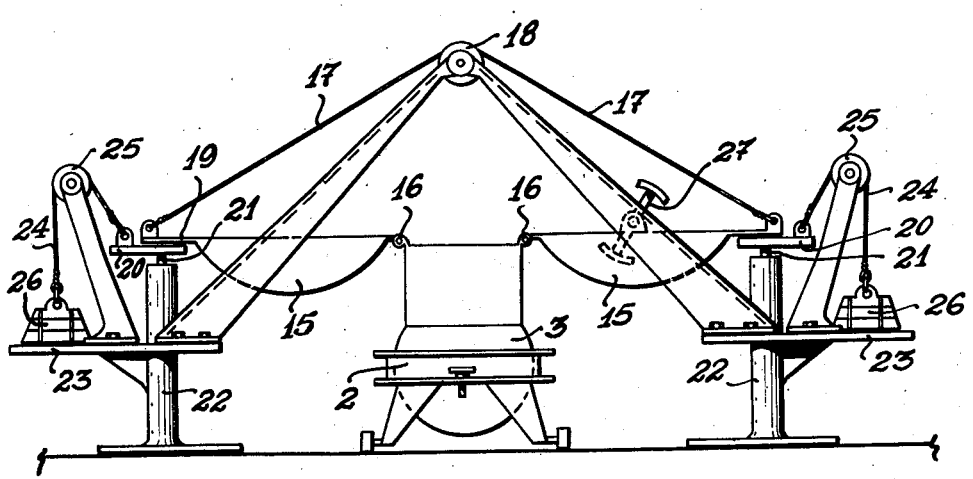
INVENTOR.
PABLO AUGUST
BY
Attorneys

United States Patent Office 2,806,680
Patented Sept. 17, 1957

2,806,680

TRANSPORTABLE CONCRETE OR MORTAR MIXER

Pablo August, Bernal, Argentina

Application August 23, 1955, Serial No. 530,131

8 Claims. (Cl. 259—161)

My present invention relates to certain new and useful improvements in concrete or mortar mixers, more particularly in transportable concrete mixers having an inclined frame and trough structure mounted on a pair of wheels for being readily moved from one place to another.

Such mixers are known not only as batch mixers, but also for continuous operation. The mixers for continuous operation are provided with proportioning means which, however, are disadvantageous insofar as they permit the proportion of the mixture components to be determined by volume only and become inoperative in case there is a blocking up of the materials in said proportioning devices.

At the other hand, the batch mixers, which in general are not provided with proportioning means, are usually charged by means of pushcarts and the proportion of the mixture components is determined by cart charges with the result that the mixture produced differs from one batch to another. Further, for the elaboration of the whole batch the mixing chamber of the machine has to be correspondingly dimensioned and it is for this reason that the trough portion wherein the proper mixing operation is carried out has a larger diameter than the trough portion destined for conveying the mixture components from the lower charging end portion to the upper mixing and discharging end portion of the mixer. This step-forming enlargement of the trough tends to create dead spaces liable to produce accumulation of materials which in turn may cause deterioration or even breakage of the mixing members. Finally, a disadvantage of the known mixers of the inclined type referred to consists in that the conveyor means provided in the lower trough portion is unable or practically unable to perform a pre-mixing of the mixture components with the result that the proper mixing operation requires a longer time and diminishes the output of the machine.

Now the main object of this invention is to provide an improved mixer of the class referred to capable of eliminating the afore-mentioned disadvantages and drawbacks.

The improved transportable concrete or mortar mixer having an inclined trough with a conveying and mixing creeper extending through the whole length of said trough, according to my present invention, is essentially characterized by that in a step-less trough free of dead spaces in its lower conveyor and upper mixing portions and having its lower end portion provided with charging means and its upper end with a closable discharge door, the conveying and mixing creeper comprises outer screw members conveying the materials in upward direction and inner screw members in the lower trough portion conveying the materials in the same direction and in the upper trough portion conveying the materials in opposite i. e. in downward direction, said screw members being so arranged and constructed that they perform in the lower trough portion a good preliminary mixing and in the upper trough portion an intensive final mixing of the materials within a relatively very short period of time.

The cylindrical and preferably conical construction of the conveyor and mixing trough of the improved mixer according to the invention, means an advantageous reduction not only of the dimensions, but also of the weight of the mixer. This trough construction, further, affords the advantage of permitting the trough over its whole length to be provided with a removable inner wall of highly resistant material capable of diminishing the expenses of maintenance and of increasing the life of the machine.

The conveying and mixing creeper according to my invention consists in the lower trough portion of helically curved outer and inner blade members which alternately are radially displaced and are arranged in such a manner that they form a continuous worm, in which arrangement the outer blades have their outer edges provided with a helical steel strip which bridging the distances between the successive outer blade members prevents the conveyed materials from accumulating and forming deposits on the inner wall of the trough, whereas the openings formed between said continuous helical steel strip and the outer edges of the said inner blade members produce the desired pre-mixing effect of the mixture components while being conveyed to the upper mixing portion of the trough.

The conveying and mixing creeper in the upper trough portion, which constitutes the proper mixing space, according to the invention also comprises outer and inner screw means of which the outer means consist of like blade members and a like helical strip as the lower creeper portion, whereas the inner screw means comprises a continuous helical blade arranged directly around the creeper shaft in such a manner that it conveys the material downwards i. e. in a direction opposite the direction of conveyance of the outer screw means thereby ensuring an intensive and thorough mixing of the materials within an extremely short period of time and economically recompensing the somewhat reduced capacity of the mixing trough.

The charging means provided at the lower end of the conveyor trough of my improved concrete or mortar mixer according to the invention comprise a pair of open weighing receptacles so arranged that their contents may be mechanically discharged into said trough and of which at least one is provided with a mixing device operatively connected with the shaft of the conveying and mixing creeper. These charging receptacles at one side are pivotally secured to the conveyor trough and at their opposite outer sides are suspended by cables for their discharging operation and freely supported by weighing devices in such a manner that by means of exchangeable weights the proportion of the mixture components may be readily controlled and that a uniform mixture of pre-established quality may be produced.

The present invention will now be described in detail with particular reference to the accompanying drawings whereon a preferred embodiment of my improved mixer has been illustrated by way of example only and whereon:

Figure 1 is a side view of the improved mixer according to my invention;

Figure 2 is a somewhat perspective view of the conveying and mixing creeper of the improved mixer;

Figures 3 and 4 are cross sectional views along the lines 3—3 and 4—4, respectively, of Figure 2;

Figure 5 is an end view showing in a somewhat schematic manner the charging devices of my improved mixer.

According to Figure 1 of the accompanying drawings, the concerete or motar mixer is mounted on a pair of wheels 1 with its frame 2 and trough 3 in a normally inclined position. The trough 3 has straight side walls and a bottom wall having a semi-circular cross-section. The shaft 4 of the conveying and mixing creeper 5 (Fig. 2) extends longitudinally through the trough 3 and is driven by a motor 6 suitably mounted on the upper end portion of the frame 2. The upper end of the trough 3 is provided with a hinged discharge door 7 which constitutes a curved and inclined end wall of the trough and the inclination of which in closed condition is of about 45° with regard to the bottom line of the trough. This arrangement of the discharge door 7 and its curvature are such that this door adapts itself to the end turn of the conveying and mixing creeper with the advantageous result that during the mixing operation accumulation of material is avoided and that thereafter the trough may be entirely emptied by the rotating creeper. The stepless trough in combination with this door arrangement avoids the formation of dead spaces within said trough and the danger of deterioration and breakage of the mixing means therein. Advantageously the trough is provided with an inner wall or lining 8 removably secured to the edges of the trough opening, this lining consisting of highly resistant sheet steel and reducing the cost of maintainance of the mixer.

The mixing means of the improved concrete or mortar mixer according to my invention consists of a conveying and mixing creeper 5 as shown in Figures 2, 3, and 4. This creeper comprises a conveyor portion 5a in the lower trough portion and a conveying and mixing portion 5b in the upper trough portion. Both creeper portions comprise outer screw members 9 and inner screw members 10 and 11, respectively. The outer screw members 9 in both creeper portions 5a and 5b are formed by individual helically curved blades secured to radial arms 12 of the shaft 4. Conveniently the blades are tapered having one end of smaller width than the opposite one. The inner screw members 10 in the creeper portion 5a are constituted by similarly curved blades directly arranged on the shaft 4. The blades 9 and 10 alternate with one another and in combination form a continuous worm arranged for a conveyance in upward direction. For the purpose of preventing the blades 9 from becoming worn out within a relatively short time and of avoiding the accumulation and setting of material on the inner wall of the trough 3 i. e. in the zones situated between the successive blades 9, the outer edges of these blades carry a helical steel strip 13 projecting slightly beyond the outer blade edges and bridging the free spaces between successive blade members 9. Thus between said helical strip 13 and the inner blade members 10 there are formed openings 14 through which parts of the upwardly conveyed material fall back with the result that the creeper portion 5a in addition to its conveying the mixture components, e. g. sand, gravel and cement, in upward direction for their delivery to the mixing portion 5b performs a good preliminary mixing of said components.

In the creeper portion 5b the screw members 9, 13 are the same as in the lower creeper portion 5a, whereas the inner screw member consists of a continuous helical blade 11 arranged directly on the shaft 4 and in such a manner that it conveys the mixture material downward i. e. in a direction opposite the conveyance direction of the outer screw members 9, 13 with the result that by the upper creeper portion 5b the mixture components are thoroughly mixed, because as will be readily appreciated the free spaces produced in the upwardly conveyed material by the individual blade members 9 are filled by material downwardly conveyed by the inner helical blade 11.

As soon as a mixing operation is finished, the door 7 is opened and the rotating conveying and mixing creeper 5 by means of its outer screw members 9, 13 of the upper creeper portion 5b effects the complete discharge of the mixture.

At the lower end of the trough and at both sides thereof the concrete or mortar mixer according to the invention comprises charging and weighing receptacles 15 of a more or less semi-circular cross section which at their inner edges are pivotally secured by means of hinges 16 to the upper longitudinal edges of the charging opening of the trough 3 and at their outer edges are freely suspended by cables 17 secured to a drum 18 or the like in such an arrangement that by rotation of said drum the receptacles 15 are lifted and caused to discharge their contents into the trough 3.

The outer edge 19 of each receptacle 15 is in contact with a plate 20 or the like provided with one or more studs 21 freely inserted into corresponding holes of one or more supporting members 22 which are interconnected by a bracket 23. Each plate 20 is suspended by a cable 24 guided by a pulley 25 and provided with exchangeable weights 26 which normally rest on the brackets 23, the arrangement being such that as long as the receptacle 15 is empty or only partly charged, the plate 20 is maintained by the cable 24 and weights 26 at certain small distances from the upper ends of the supporting members 22, but as soon as the charge of the receptacle equals the weight of the weights 26 the outer edge 19 of the receptacle 15 will move downwards until resting upon said supporting elements with the result that in this manner and eventually with the aid of a signalling device operated by said downward movement the quantity by weight of the mixture components may be readily controlled and exactly determined for the purpose of producing a uniform and preestablished quality of the concrete or mortar.

One of the receptacles 15 is provided with a rotatory mixing device 27 capable of being operated by means of a belt or the like from the shaft 4, for the purpose of effecting a preliminary mixing of, for instance, sand and cement during the operation of charging the receptacle 15. The second receptacle destined for receiving the charge of gravel does not require the provision of a mixing device. As soon as both receptacles 15 are charged, by operation of the drum 18 the cables 17 simultaneously lift the two receptacles causing the same to discharge their contents into the trough 3, wherein the mixture components are conveyed upwards under pre-mixing. As soon as the first material reaches the upper end of the trough, the water-supply pipe from the tank 29 to the sprayer 30 is opened to discharge a predetermined quantity of water into the mixing zone 5b of the trough. The mixing period in this improved concrete or mortar mixer having a mixing length of about 1.5 m. is reduced to less than one minute, with the advantageous result that if charging of the receptacles 15 is performed in like periods of time the mixer may be operated continuously or with practically the same output as a continuously operated mixer.

It will be understood that the present invention is by no means restricted to the embodiment as described and illustrated, but that modifications as to details of arrangement, form and construction of parts may be readily introduced therein, and that such modifications are to be considered as falling within the scope of the invention as clearly set forth in the appended claims.

What I claim as new and desire to secure by Letters Patent is:

1. A transportable batch mixer for preparing concrete and mortar mixtures with substantially the same output of a continuously operating mixer, comprising in combination: a pair of supporting wheels, an inclined frame supported by said wheels, an open stepless trough fixedly mounted within said frame in an inclined position and having straight side walls, a bottom wall of substantially semi-circular cross-section with a closeable discharge opening at the upper end of the bottom of said trough and an upper front wall being at least in part inclined at an obtuse angle with regard to said bottom wall, a screw shaft extending throughout the length of said trough and a driving motor mounted on the top end portion of said frame and operatively connected with said screw shaft, a conveying and mixing creeper mounted on said shaft and extending throughout the length of said trough, said creeper comprising a lower premixing and conveying portion for conveying the mixture components in upward direction only and an upper mixing and conveying portion capable of conveying the mixture material in both directions upwards and downwards, both creeper portions having spaced but circumferentially interconnected outer screw members, and inner screw means which in the lower creeper portions are constituted by individual spaced blades and in the upper portion by a single continuous helical blade with turns in opposite direction to those of said outer screw members.

2. A transportable batch mixer for preparing concrete and mortar mixtures with substantially the same output of a continuously operating mixer, comprising in combination: a pair of supporting wheels, an inclined frame supported by said wheels, an open stepless trough fixedly mounted within said frame in an inclined position and having straight side walls, a bottom wall of substantially semi-circular cross-section with a closeable discharge opening at the upper end of the bottom of said trough and an upper front wall being at least in part inclined at an obtuse angle with regard to said bottom wall, a screw shaft extending throughout the length of said trough and a driving motor mounted on the top end portion of said frame and operatively connected with said screw shaft, a conveying and mixing creeper mounted on said shaft and extending throughout the length of said trough, said creeper comprising a lower premixing and conveying portion for conveying the mixture components in upward direction only and an upper mixing and conveying portion capable of conveying the mixture material in both directions upwards and downwards, both creeper portions having spaced but circumferentially interconnected outer screw members, consisting of individual helically curved blades arranged at certain distances from one another on a helical path and interconnected by a continuous helical strip secured to the outer edges of said blades so as to project beyond these outer blade edges and to bridge the distances between successive blades, and inner screw means which in the lower creeper portions are constituted by individual spaced blades and in the upper portion by a single continuous helical blade with turns in opposite direction to those of said outer screw members.

3. A transportable batch mixer for preparing concrete and mortar mixtures with substantially the same output of a continuously operating mixer, comprising in combination: a pair of supporting wheels, an inclined frame supported by said wheels, an open stepless trough fixedly mounted within said frame in an inclined position and having straight side walls, a bottom wall of substantially semi-circular cross-section with a closeable discharge opening at the upper end of the bottom of said trough and an upper front wall being at least in part inclined at an obtuse angle with regard to said bottom wall, a screw shaft extending throughout the length of said trough and a driving motor mounted on the top end portion of said frame and operatively connected with said screw shaft, a conveying and mixing creeper mounted on said shaft and extending throughout the length of said trough, said creeper comprising a lower pre-mixing and conveying portion for conveying the mixture components in upward direction only and an upper mixing and conveying portion capable of conveying the mixture material in both directions upwards and downwards, both creeper portions comprising outer and inner screw members, said outer screw members in both creeper portions, said inner screw members in said lower creeper portion consisting of individual helically curved blades in alternate arrangement and radial displacement with regard to said inner screw members in said upper creeper portion, a continuous helical strip secured to the outer edges of said outer screw blades so as to project beyond these outer blade edges and to bridge the distances between the successive outer blades, and the said inner screw member in said upper creeper portion consisting of a continuous helical blade arranged on the creeper shaft within said outer screw members in said upper creeper portion.

4. A transportable batch mixer for preparing concrete and mortar mixtures with substantially the same output of a continuously operating mixer, comprising in combination: a pair of supporting wheels, an inclined frame supported by said wheels, an open stepless trough fixedly mounted within said frame in an inclined position and having straight side walls, a bottom wall of substantially semi-circular cross-section with a closeable discharge opening at the upper end of the bottom of said trough and an upper front wall being at least in part inclined at an obtuse angle with regard to said bottom wall, a screw shaft extending throughout the length of said trough and a driving motor mounted on the top end portion of said frame and operatively connected with said screw shaft, a conveying and mixing creeper mounted on said shaft and extending throughout the length of said trough, said creeper comprising a lower pre-mixing and conveying portion for conveying the mixture components in upward direction only and an upper mixing and conveying portion capable of conveying the mixture material in both directions upwards and downwards, both creeper portions having spaced, but circumferentially interconnected outer screw members, and inner screw means which in the lower creeper portions are constituted by individual spaced blades and in the upper portion by a single continuous helical blade with turns in opposite directions to those of said outer screw members.

5. A transportable batch mixer for preparing concrete and mortar mixtures according to claim 4, wherein the closeable discharge opening is arranged in the said inclined portion of the upper front wall of said trough.

6. A transportable batch mixer for preparing concrete and mortar mixtures according to claim 4, wherein the said discharge opening of the said trough is closed by a hinged door so arranged as to provide a discharging device.

7. A transportable batch mixer for preparing concrete and mortar mixtures with substantially the same output of a continuously operating mixer, comprising in combination: a pair of supporting wheels, an inclined frame supported by said wheels, an open stepless trough fixedly mounted within said frame in an inclined position and having straight side walls, and a bottom wall of substantially semi-circular cross-section with a closeable discharge opening at the upper end of the bottom of said trough and an upper front wall being at least in part inclined at an obtuse angle with regard to said bottom wall, a screw shaft extending throughout the length of said trough and a driving motor mounted on the top end portion of said frame and operatively connected with said screw shaft, a conveying and mixing creeper mounted on said shaft and extending throughout the length of said trough, said creeper comprising a lower pre-mixing and conveying portion for conveying the mixture components in upward direction only and an upper mixing and conveying portion capable of conveying the mixture material in both directions upwards and downwards, both creeper portions having spaced, but circumferentially interconnected outer screw members, and inner screw means which in the lower creeper portions are constituted by individual spaced blades and in the upper portion by a single continuous helical blade with turns in opposite directions to those of said outer screw members, and a charging receptacle pivotally connected to each side of the lower end portion of said trough, a pair of weighing devices for supporting the outer edge of said receptacles and driving means operatively connected with these receptacles for discharging their contents into said trough.

8. A transportable batch mixer for preparing concrete and mortar mixtures with substantially the same output of a continuously operating mixer, comprising in combination: a pair of supporting wheels, an inclined frame supported by said wheels, an open stepless trough fixedly mounted within said frame in an inclined position and having straight side walls, a bottom wall of substantially semi-circular cross-section with a closeable discharge opening at the upper end of the bottom of said trough and an upper front wall being at least in part inclined at an obtuse angle with regard to said bottom wall, a screw shaft extending throughout the length of said trough and a driving motor mounted on the top end portion of said frame and operatively connected with said screw shaft, a conveying and mixing creeper mounted on said shaft and extending throughout the length of said trough, said creeper comprising a lower pre-mixing and conveying portion for conveying the mixture components in upward direction only and an upper mixing and conveying portion capable of conveying the mixture material in both directions upwards and downwards, both creeper portions having spaced, but circumferentially interconnected outer screw members, and inner screw means which in the lower creeper portions are constituted by individual spaced blades and in the upper portion by a single continuous helical blade with turns in opposite directions to those of said outer screw members, a pair of open receptacles having one longitudinal edge pivotally secured to opposite side walls of the said mixing trough and their opposite longitudinal edge suspended by cables connected to a common drum capable of being mechanically operated for lifting said receptacles and discharging their contents into said trough, and a weighing device for each of said receptacles consisting of a plate member provided with studs for guiding the same in hollow supporting elements and suspended by a cable guided by a pulley and provided with exchangeable weights, and a bracket secured to said supporting elements for carrying said weights in their inoperative position.

References Cited in the file of this patent

UNITED STATES PATENTS

| | | |
|---|---|---|
| 746,664 | Bourdeau | Dec. 15, 1903 |
| 808,599 | Crichfield | Dec. 26, 1905 |
| 1,730,912 | Bried | Oct. 8, 1929 |
| 2,027,185 | Loomis | Jan. 7, 1936 |
| 2,100,229 | Van Orden | Nov. 23, 1937 |
| 2,608,395 | August | Aug. 26, 1952 |